United States Patent [19]
Drake et al.

[11] Patent Number: 5,535,226
[45] Date of Patent: Jul. 9, 1996

[54] ON-CHIP ECC STATUS

[75] Inventors: Charles E. Drake; John A. Fifield, both of Underhill, Vt.; Richard D. Wheeler, Millerton, N.Y.; Barry J. Wolford, Austin, Tex.

[73] Assignee: International Business Machines Corporation, Armonk, N.Y.

[21] Appl. No.: 251,056

[22] Filed: May 31, 1994

[51] Int. Cl.$^6$ .............................. G06F 11/10; G11C 29/00
[52] U.S. Cl. ......................................... 371/40.1; 371/21.1
[58] Field of Search ................................. 371/40.1, 40.2, 371/40.4, 3, 10.1, 15.1, 16.1, 16.5, 21.1; 365/200, 201

[56] References Cited

U.S. PATENT DOCUMENTS

| | | | |
|---|---|---|---|
| 3,735,105 | 5/1973 | Maley | 235/153 AC |
| 4,058,851 | 11/1977 | Scheuneman | 364/900 |
| 4,185,269 | 1/1980 | Hodges et al. | 371/39.1 |
| 4,359,771 | 11/1982 | Johnson et al. | 371/13 |
| 4,706,249 | 11/1987 | Nakagawa et al. | 371/38 |
| 4,730,320 | 3/1988 | Hidaka et al. | 371/38.1 |
| 4,833,677 | 5/1989 | Jarwala et al. | 371/21 |
| 4,903,268 | 2/1990 | Hidaka et al. | 371/40.1 |
| 5,012,472 | 4/1991 | Arimoto et al. | 371/40.1 |
| 5,022,031 | 6/1991 | Baggen | 371/43 |
| 5,058,115 | 10/1991 | Blake et al. | 371/401 |
| 5,127,014 | 6/1992 | Raynham | 371/37.3 |
| 5,134,616 | 7/1992 | Barth, Jr. et al. | 371/10.3 |
| 5,228,046 | 7/1993 | Blake et al. | 371/38.1 |
| 5,307,356 | 4/1994 | Fifield | 371/40.1 |

*Primary Examiner*—Paul P. Gordon
*Attorney, Agent, or Firm*—Lawrence D. Cutter; Wayne F. Reinke

[57] ABSTRACT

In one aspect, a memory device employing device-level error correction tracks the status of the error correction in terms of whether error correction is active or inactive, whether an uncorrectable error beyond the capability of the device-level correction is detected, whether a recovery option from an uncorrectable error is active and whether the recovery option has been reset. In another aspect, a diagnostic method for determining a status for one or more aspects of device-level error correction employed by a memory device is provided. In the diagnostic method, the status is determined for the one or more aspects, a flag is set based on the status, the flag is latched, a diagnostic code is input into the memory device and the latched flag is read.

18 Claims, 3 Drawing Sheets

ON-CHIP ECC STATUS

BACKGROUND OF THE INVENTION

TECHNICAL FIELD

The present invention generally relates to error correction in computers. More particularly, the present invention relates to determining the status of on-chip error correction in memory devices.

BACKGROUND

In the past, system-level Error Correction Code (hereinafter, "ECC") schemes have only been included on high-end main frame systems. As one of ordinary skill in the art will know, the ECC word accompanying retrieved data is what you end up with after the data is run through an ECC algorithm. The data fetched from memory is run through the algorithm and if the result matches the ECC word, then the data is correct; if not, there is an error. Some ECC algorithms can even pinpoint which data bits are in error. Such ECC schemes are rapidly making their way into lower-end main frame systems and workstations, and eventually will likely be included in personal computers as well. In addition to system-level ECC schemes, some memory chips also include on-chip ECC schemes to correct simple errors, leaving the more complex errors for the system-level ECC scheme. On-chip ECC not only improves efficiency, it allows a greater manufacturing yield, since each chip need not be perfect. Recently, a "compatibility" problem has surfaced between the system-level ECC schemes and the on-chip ECC schemes affecting computer systems employing both types of error correction. In general, the widely used complement/recomplement system-level ECC scheme relies on the reproducibility of errors, however, on-chip or device-level ECC schemes attempting to correct bits prevent some errors from being reproduced.

For some time now, system-level ECC schemes have employed what is known as "complement/recomplement" (hereinafter, "comp/recomp") to find and correct data errors. Generally, comp/recomp determines whether a particular memory cell is "stuck at" a 1 or a 0. The specifics of comp/recomp and basis of the incompatibility are best explained through an example. However, some helpful background information regarding comp/recomp will first be provided.

The operation of comp/recomp will now be explained Consider four bits being read "1 1 1 1", where the third and fourth bits are actually incorrect; that is, the data should be "1 1 0 0". Through the use of checkbits, the error can be found, as one in the art will know. Comp/recomp first complements the data that was read, resulting in "0 0 0 0" and writes the complemented data back to the same memory location. As used herein, complement merely refers to changing a 1 to a 0 and vice-versa. After writing back the complemented data, the data in that memory location is again read back to determine if a "stuck-at" error exists, with the result being "0 0 1 1". Thus, we know that positions three and four are each stuck at a 1, since 0's were written and 1's were read. The most recently read data is then recomplemented, resulting in "1 1 0 0", which is what the data was supposed to be. On-chip error correction effectively masks the stuck-at error. Next, the compatibility problem between comp/recomp at the system level and device-level ECC schemes will be explained.

Consider an array of four memory devices, each segmented into four quadrants, each quadrant outputting one bit of information for a possible total of 16 bits of information from all four memory devices. It will be understood that in actual systems, there are 16, 32, 64 or more such memory devices in parallel outputting onto a system bus. Although each chip outputs four identical bits (if no quadrant is having an error), only one bit from each is actually used (the same ordered bit from each memory device), in order to decrease the effects of a bad quadrant on any particular memory device. Assume that only the third bit from each device is used, but that two of the devices are experiencing double errors; that is, two of the four quadrants on two chips are experiencing errors. In addition, assume that each chip has on-chip ECC with single bit error correction capabilities.

Referring now to Table 1, lines with a single-bit data entry (e.g., line (3)) indicate data on the system bus or at the system level. Lines with a four-bit data entry indicate data inside the particular chip, indicated at the column headings. Line (1) shows data stored at a given DRAM address in chips 1 through 4. Assume now that both chips 1 and 2 are experiencing a hard error in position 3 and a soft error in position 4. Thus, on-chip ECC cannot correct the errors. Line (2) shows data retrieved from the given address in DRAM and placed in SRAM. Line (3) shows bit 3 from each chip as placed on the system data bus. At this point, system-level error correction detects a double-bit error, invoking comp/recomp. The data on line (3) is complemented at line (4) and written back to system memory. The complemented data merged with the data in SRAM (with associated ECC check bits for this data pattern that are not shown) is shown on line (5) and written back to the given DRAM address. The data is then read back and a single bit error is detected in position 3 by the on-chip ECC of both chips 1 and 2, shown on line (6).

TABLE 1

|      | CHIP 1 | CHIP 2 | CHIP 3 | CHIP 4 |
|------|--------|--------|--------|--------|
| (1)  | 0000   | 0000   | 1111   | 1111   |
| (2)  | 0011   | 0011   | 1111   | 1111   |
| (3)  | 1      | 1      | 1      | 1      |
| (4)  | 0      | 0      | 0      | 0      |
| (5)  | 0001   | 0001   | 1101   | 1101   |
| (6)  | 0011   | 0011   | 1101   | 1101   |
| (7)  | 0001   | 0001   | 1101   | 1101   |
| (8)  | 0      | 0      | 0      | 0      |
| (9)  | 1      | 1      | 1      | 1      |
| (10) | 0      | 0      | 1      | 1      |

Line (7) shows the data after on-chip ECC has corrected the single-bit errors in chips 1 and 2. Bit 3 from each chip is placed on the system bus, shown on line (8). The data, after correction at the chip level, now appears at the system level. The system complements the data, shown at line (9). Line (10) shows what the data used by the system should be; that is, bit 3 from each chip at line (1). Thus, the double errors were not reproducible and the error correction failed at the system level, due to the masking effect of the chip-level ECC.

In operation, when a memory card is indicated by the system as producing too many errors, a field engineer will take the memory card back to a lab for testing. However, when there are "system only" fails, i.e., errors that only occur when the card is in the system, the field engineer will be unable to determine which chip or chips is bad, since he will be unable to recreate the conditions under which the errors occurred. In addition, if a particular chip has multiple-bit errors, it may turn off the on-chip ECC. However, when the card is removed from the system, removing power thereto, which is restored at the lab, on-chip ECC comes back on and the field engineer has no way of knowing which chip turned off its ECC. Thus, if the status of the on-chip ECC could be captured prior to removing the card, the field engineer could determine which chip had turned off its ECC, among other aspects of on-chip ECC.

Thus, a need exists in a computer system having on-chip ECC to determine which memory device is producing errors beyond the capability of the on-chip ECC to handle, and, more generally, to determine to the status of different aspects of on-chip error correction.

SUMMARY OF THE INVENTION

In accordance with the above, it is an object of the present invention to provide a way to determine which memory device is producing errors beyond the capability of on-chip error correction to correct.

It is another object of the present invention to provide a way to determine the status of one or more aspects of on-chip error correction.

It is still another object of the present invention to provide a memory device with error correction status determining capability.

It is a further object of the present invention to provide a computer system having compatible system-level error correction and device-level error correction.

Briefly, the present invention satisfies the above objects by providing a method and apparatus for determining the status of device-level error correction in a memory device.

More specifically, the present invention provides, in a first aspect, a memory device employing error correction. The memory device comprises means for activating the error correction, means for deactivating the error correction and means for determining a status for the error correction.

A second aspect of the present invention provides a method for determining a status for device-level error correction employed by a memory device. The device-level error correction is capable of correcting a predetermined number of simultaneously occurring errors. The method comprises determining whether a given error is uncorrectable by said device-level error correction, setting a first flag based on whether the given error is determined to be uncorrectable and latching the set first flag. The method may further comprise disabling the device-level error correction if the given error is determined to be uncorrectable, setting a second flag based on whether the device-level error correction is disabled and latching the set second flag. The method may also comprise disabling the device-level error correction if the given error is determined to be uncorrectable, optionally reenabling the device-level error correction if previously disabled, determining whether the reenabling option is active, setting a third flag based on whether the reenabling option is determined to be active and latching the set third flag. The method may still further include, where the reenabling option includes resetting thereof, determining whether the optional resetting is active, setting a fourth flag based on whether the optional resetting is determined to be active and latching the set fourth flag.

In a third aspect of the present invention, a diagnostic method for determining a status for at least one predetermined aspect of device-level error correction employed by a memory device is provided. The diagnostic method comprises determining the status based on the input diagnostic code, setting a flag based on the determined status, latching the set flag, inputting a diagnostic code into the memory device and reading the latched set flag.

These, and other objects, features and advantages of this invention will become apparent from the following detailed description of the various aspects of the invention taken in conjunction with the accompanying drawings.

BEST MODE FOR CARRYING OUT THE INVENTION

Figure 1:
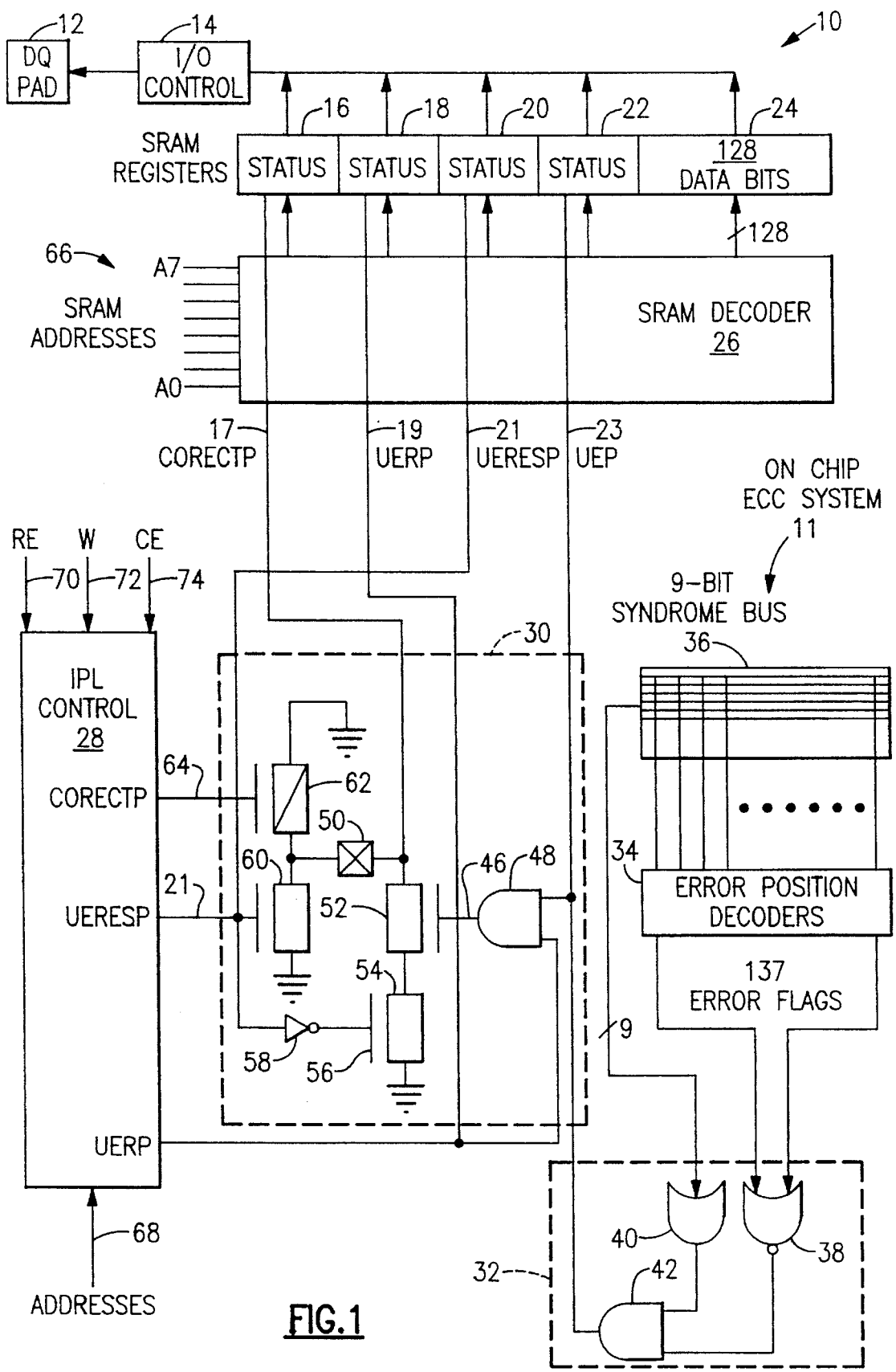
FIG. 1 depicts a circuit for determining the status of device-level error correction employed by a memory device according to a first aspect of the present invention.

FIG. 1 depicts a subcircuit 10 of a DRAM chip providing the status of an on-chip ECC system 11 for one quadrant of the chip. It will be understood that three other such subcircuits exist to provide a complete status outlook for the DRAM chip. Shown in FIG. 1 is output pad 12, I/O control 14, SRAM registers 16, 18, 20, 22 and 24, SRAM decoder 26, Initial Program Load (IPL) controller 28, ECC control/status subcircuit 30, error flag subcircuit 32, error position decoders 34 and 9-bit syndrome bus 36.

The operation of subcircuit 10 and the components within will now be described. Output pad 12 provides the status of SRAM registers 16, 18, 20 and 22 to the off-chip world. I/O control 14 works as an interface and provides the timing between SRAM status registers 16, 18, 20 and 22, and output pad 12. SRAM status registers 16, 18, 20 and 22 are essentially latches holding the status of four aspects of on-chip ECC system 11 with respect to that quadrant. Although only four aspects of the on-chip ECC system are discussed herein, further aspects could be tracked, or less than all four aspects could be tracked. Register 16 holds a flag describing the on/off status of the on-chip ECC system for that quadrant. The input to register 16 is line 17, on which the CORECTP flag is either low or high (CORECTP stands for "Correction on Positive"). If the output of register 16 (i.e., CORECTP) is low, error correction for that quadrant is currently disabled; and if high, error correction is active. The input to register 18 is line 19, on which the UERP flag is either low or high (UERP stands for "Uncorrectable Error Recovery on Positive"). If the output of register 18 (i.e., UERP) is high, then the uncorrectable error recovery mode is active. The uncorrectable error recovery mode turns error correction off when an uncorrectable error is encountered. The input to register 20 is line 21, on which the UERESP flag is either low or high (UERESP stands for "Uncorrectable Error Reset Positive"). If the output of register 20 (i.e., UERESP) is pulsed high, then on-chip error correction is turned back on if it had been turned off earlier by action of the uncorrectable error (hereinafter, "UE") recovery system. In other words, the UERESP flag going high allows correction to come back on after the information with the uncorrectable error is output (for the system-level ECC to correct).

The temporary turn-off ends when UERESP goes low. The input to register 22 is line 23, on which the UEP flag is either low or high (UEP stands for "Uncorrectable Error Positive"). If the output of register 22 (i.e., UEP) is high, an uncorrectable error has occurred. In the present exemplary embodiment, an uncorrectable error occurs in a chip when more than a single bit error in any single quadrant occurs. In other words, device-level error correction can correct a single bit error, but multiple-bit errors are handled by system-level error correction. Once UEP goes high, it will not go low again until on-chip ECC system 11 has either been restored or accesses a new cycle.

Nine-bit syndrome bus 36 within on-chip ECC system 11 holds the binary location of an incorrect bit within the 137 bit wide ECC word, comprised of 128 bits of data and 9 check bits. The data bits can be accessed through SRAM Register 24 by inputting the proper address on address lines 66 which is decoded by SRAM decoder 26. Error position decoders 34 include one decoder for each of the 137 positions in the ECC word. An individual error position decoder corresponding to an odd address on the syndrome bus will respond by asserting an error flag. Odd numbered addresses on the syndrome bus indicate an odd number of errors, however, more than one error results in no error position decoders firing. Even numbered addresses on the syndrome bus indicate an even number of bit errors. The purpose of error flag subcircuit 32 is to differentiate between an error that device-level error correction can correct and other errors; in this case, differentiating between a single bit and a multiple bit error.

Error flag subcircuit 32 is comprised of NOR gate 38, OR gate 40 and AND gate 42. All 137 error flags feed into NOR gate 38, and if one of them goes high, the output of NOR gate 38 will go low. The lines from 9-bit syndrome bus 36 feed into OR gate 40, so that whenever there is a nonzero address on syndrome bus 36, the output of OR gate 40 is high. The output of NOR gate 38 and OR gate 40 are fed into AND gate 42. If the output of AND gate 42 (connected to UEP line 23 into register 22) is high, an UE has surfaced (UEP is also high). The output of AND gate 42 is also fed to ECC control/status subcircuit 30. The situation where a nonzero address is present on syndrome bus 36 and no error position decoder fires is possible, since the "keys" to make the decoders fire are odd numbers on the syndrome bus and any even number (or an odd number where an error position decoder did not fire) indicates a multiple bit error.

ECC control/status subcircuit 30 is the logic that provides turn-on and turn-off of on-chip ECC as well as the status of the CORECTP flag input to status register 16. If the UEP flag line 23, driven by the output of AND gate 42, goes high and the UERP flag line 19 goes high (if line 19 is high, then UE recovery is on), then the output 46 of AND gate 48 will go high, triggering the disablement of local (on-chip) error correction by disabling correction latch 50. "Disabling" correction latch 50 herein refers to turn-off of on-chip error correction with that state being stored in the correction latch. AND gate 48 is present due to the fact that some smaller computer systems do not have UE recovery; that is, they do not turn off on-chip ECC. In smaller computer systems, the on-chip ECC scheme is always on, and although this may sometimes result in a system failure, there is no compatibility problem such as that which this invention solves, since at present, system-level ECC is not included in smaller computer systems. However, as noted previously, this will likely change. The output of correction latch 50 is the CORECTP flag line 17, which is normally high, meaning that correction is on. The output of AND gate 48 going high causes NFET 52 to turn on, assuming NFET 54 is on due to the UERESP flag line 21 being low (UE reset is off) and inverted to high at gate 56 by inverter 58. With NFET 54 on, the CORECTP flag line 17 falls to ground when NFET 52 is turned on. This turns off local error correction. When UE reset is on, i.e., UERESP flag line 21 is pulsed high, NFET 60 turns on (and NFET 54 off), which resets or clears correction latch 50. PFET 62 is normally off, since the COROFFN flag line 64 is normally high. When the COROFFN flag goes low, PFET 62 turns on, and forces CORECTP low, disabling correction. CORECTP is held low by latch 50. Note that UERESP flag line 21 is pulsed high when that quadrant has successfully recovered from an uncorrectable error.

In order to determine the status of a given ECC status flag, an address is input at address lines 66 into SRAM decoder 26, which interprets the address and allows reading of the corresponding status register. In this exemplary embodiment, only one status register at a time can be read. However, it will be understood that with design changes one skilled in the art will know, multiple status registers could simultaneously be read.

IPL controller 28 operates in accordance with JEDEC (Joint Electron Device Engineering Council) standards of 1994, with its main purpose being the generation of initial program load (hereinafter, "IPL") control codes. When the chip is first powered up, IPL controller 28 determines how it will operate. For example, there are IPL codes controlling how information in the memory will be accessed. The IPL controller is also used herein to "tell" the chip whether it will have on-chip ECC on all the time, off all the time or UE recovery will be on. When RE line 70 and CE line 74 are low and W line 72 is high, an address on address lines 68 is decoded by IPL controller 28 to determine the state of the three output lines from IPL controller 28; that is, COROFFN flag line 64, UERESP flag line 21 and UERP flag line 19.

Figure 2:
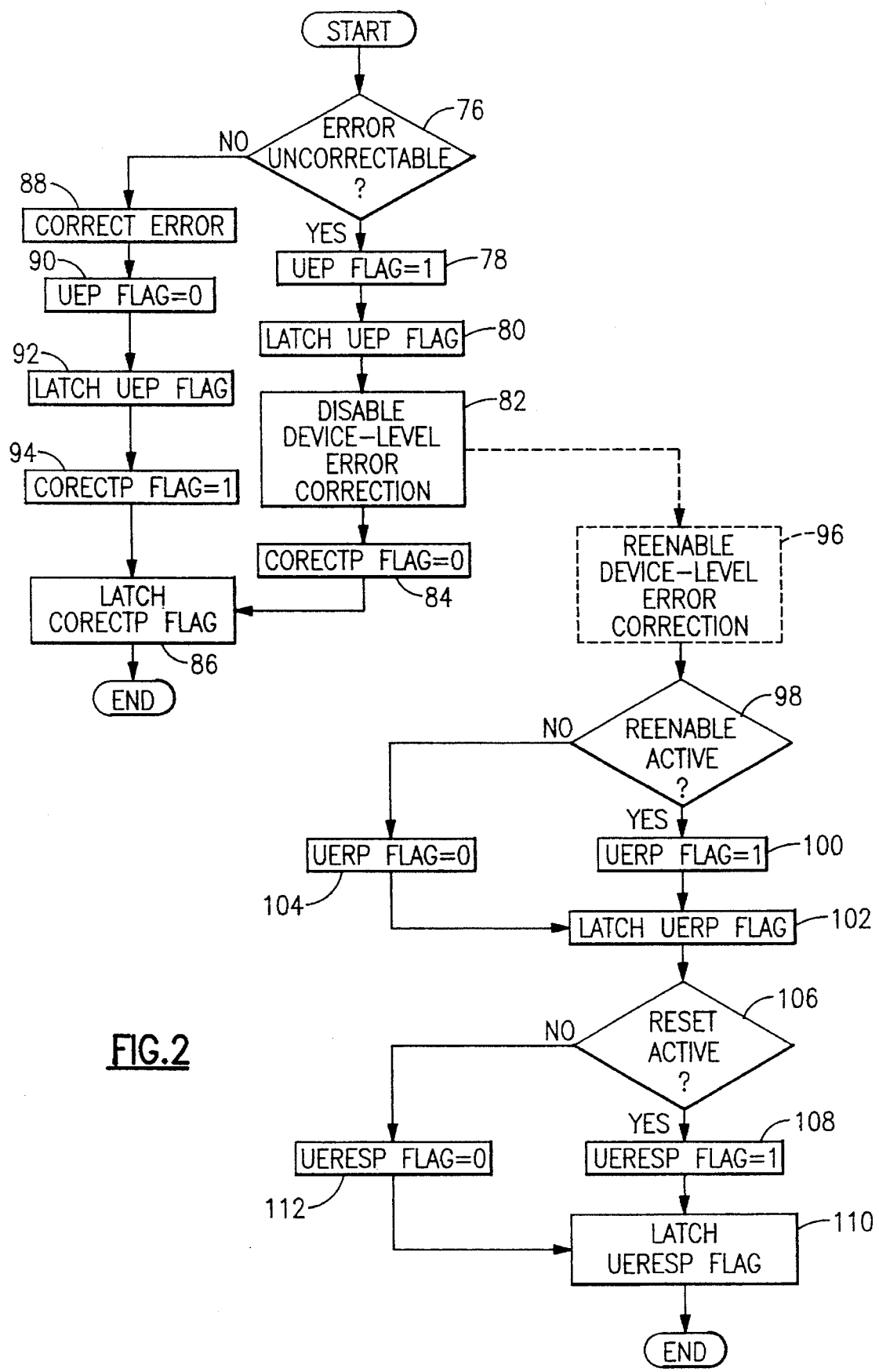
FIG. 2 is a flow diagram of a method for determining a status for device-level error correction employed by a memory device according to a second aspect of the present invention.

FIG. 2 is a flow diagram of a method for determining a status for device-level error correction employed by a memory device in accordance with a second aspect of the present invention. Initially, it is determined whether a given error is uncorrectable (INQUIRY 76 "ERROR UNCORRECTABLE?") using the error flag subcircuit 32 of FIG. 1. If the error is determined to be uncorrectable, then the UEP flag will be set to 1 (STEP 78 "UEP FLAG=1") and latched in register 22 (STEP 80 "LATCH UEP FLAG"). After latching the UEP flag, the device-level error correction is disabled (STEP 82 "DISABLE DEVICE-LEVEL ERROR CORRECTION") and the CORECTP flag is set to 0 (STEP 84 "CORECTP FLAG=0") and latched in register 16 (STEP 86 "LATCH CORECTP FLAG").

If the error was determined in INQUIRY 76 to be correctable, the error is corrected by the device-level error correction system (STEP 88 "CORRECT ERROR"). In addition, since the error was correctable, the UEP flag is set to 0 (STEP 90 "UEP FLAG=0") and latched in register 22 (STEP 92 "LATCH UEP FLAG"). Since error correction was not disabled, the CORECTP flag is set to 1 (STEP 94 "CORECTP FLAG=1") and latched (STEP 86 "LATCH CORECTP FLAG").

Preferably, the employed device-level error correction includes an optional feature for recovery from the effects of an uncorrectable error; that is, turning error correction back on (STEP 96 "REENABLE DEVICE-LEVEL ERROR CORRECTION"). Thus, an inquiry is made as to whether the recovery feature is active (STEP 98 "REENABLE ACTIVE?"). If the reenable feature is active, the UERP flag is set to 1 (STEP 100 "UERP FLAG=1") and latched in register 18 (STEP 102 "LATCH UERP FLAG"). If the reenable feature is inactive, the UERP flag is set to 0 (STEP 104 "UERP FLAG=0") and latched (STEP 102).

The recovery feature also preferably includes a reset option. The reset feature is activated by pulsing UERESP high, which resets latch 50 to hold CORECTP high to enable on-chip correction after an UE has triggered the UE recovery system to turn on-chip error correction off. If the reset option is included, an inquiry is made as to whether it is active (INQUIRY 106 "RESET ACTIVE?"). If the reset option is active, the UERESP flag is set to 1 (STEP 108 "UERESP FLAG=1") and latched in register 20 (STEP 110 "LATCH UERESP FLAG"). If the reset feature is inactive, then the UERESP flag is set to 0 (STEP 112 "UERESP FLAG=0") and latched (STEP 110).

Figure 3:
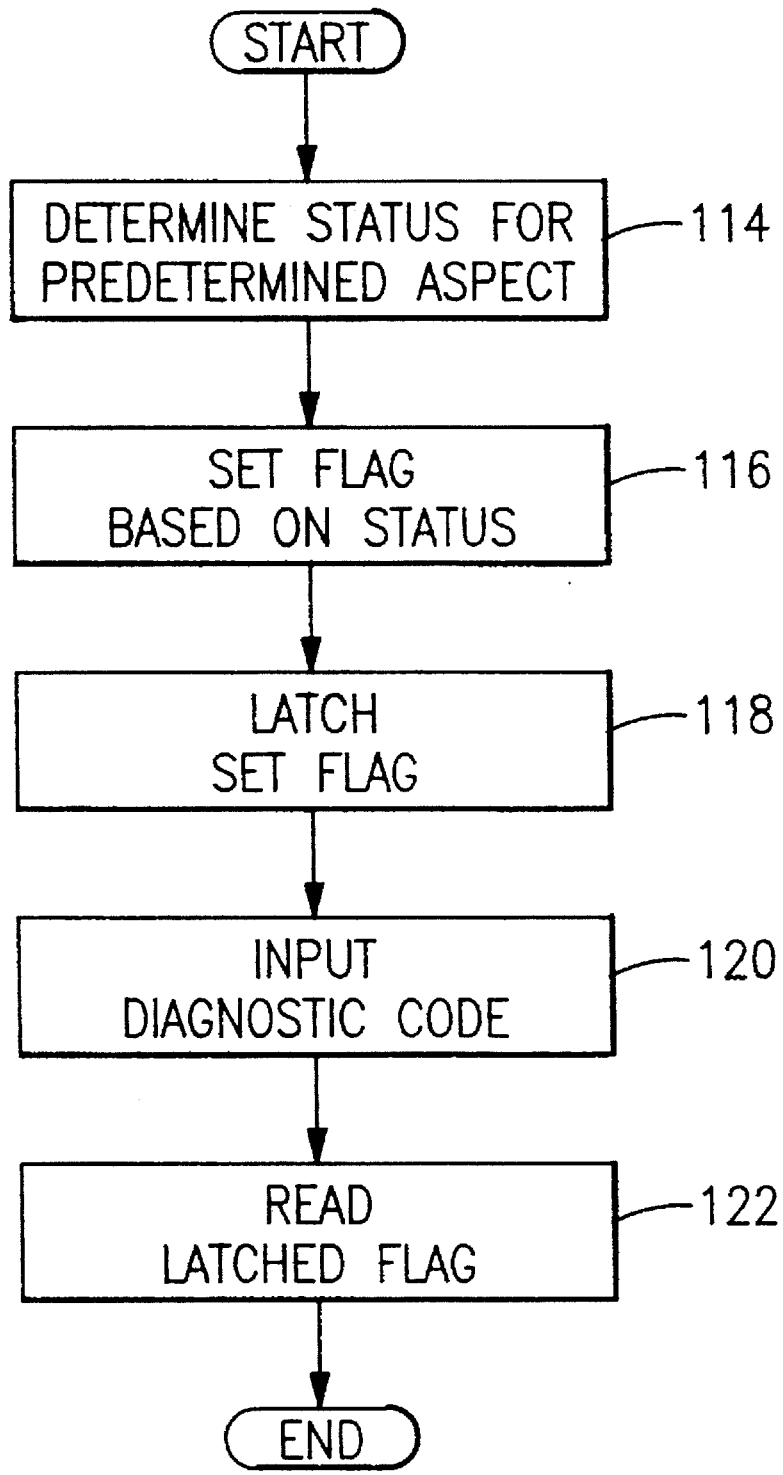
FIG. 3 is a flow diagram of a diagnostic method for determining a status for device-level error correction employed by a memory device according to a third aspect of the present invention.

The on-chip ECC status apparatus of the first embodiment is useful, as noted above in the background, for diagnostics. Thus, in a third aspect of the present invention, a diagnostic method for determining the status of a memory device employing device-level error correction is provided. FIG. 3 is a flow diagram for the method of the third aspect. Initially, a status for one or more predetermined aspects is determined (STEP 114 "DETERMINE STATUS FOR PREDETERMINED ASPECT"). For example, one aspect could be whether error correction is active, and another could be whether the recovery option is active. After the status is determined, a flag is set for each of the aspects (STEP 116 "SET FLAG BASED ON STATUS") and latched (STEP 118 "LATCH SET FLAG"). It will be understood that the status determination is an ongoing activity within the memory device. In this way, when the status information is needed, it is current. Thus, a diagnostic code is input via an address on address lines 66 (STEP 120 "INPUT DIAGNOSTIC CODE"). In response to the input code, the desired aspect is read (STEP 122 "READ LATCHED FLAG") through control pad 12.

While several aspects of the present invention have been described and depicted herein, alternative aspects may be effected by those skilled in the art to accomplish the same objectives. For example, the logic in ECC control/status subcircuit 30 and/or error flag subcircuit 32 could be designed differently and accomplish the same purposes.

Accordingly, it is intended by the appended claims to cover all such alternative aspects as fall within the true spirit and scope of the invention.

We claim:

1. An integrated circuit employing error correction, said integrated circuit comprising:

an error correction activator;

an error correction deactivator;

error correction status tracking circuitry, comprising:
error correction status signal generating circuitry, wherein said error correction status signal generating circuitry comprises: a correction latch; circuitry for latching said correction latch; and circuitry for resetting said correction latch; and a latch for latching said generated error correction status signal.

2. The integrated circuit of claim 1, wherein said latching circuitry comprises a PFET and wherein said resetting circuitry comprises an NFET.

3. A memory device employing error correction, wherein said error correction is capable of correcting a predetermined number of simultaneous errors, said memory device comprising:

means for activating said error correction;

means for deactivating said error correction;

means for determining a status for said error correction; and means for determining whether a given error includes more than said predetermined number of simultaneous errors, wherein said error determining means comprises:

a bus for communicating a coded error position indicator;

a decoder coupled to said bus for decoding said error position indicator; and logic circuitry coupled to said bus and said decoder for determining whether said error correction is capable of correcting said given error.

4. The memory device of claim 3 wherein said decoding means comprises a plurality of error position decoders.

5. The memory device of claim 4, wherein said plurality of error position decoders includes one decoder for each bit in a multi-bit error correction word and wherein said logic circuitry comprises:

a NOR gate having an input coupled to each of said plurality of error position decoders;

an OR gate having an input coupled to said bus; and an AND gate having an input coupled to an output from each of said NOR gate and said OR gate.

6. A memory device employing error correction, wherein said error correction is deactivated in response to an uncorrectable error and wherein said error correction includes uncorrectable error recovery, said memory device comprising:

means for activating said error correction;

means for deactivating said error correction;

means for determining a status for said error correction;

means for activating said uncorrectable error recovery;

means for deactivating said uncorrectable error recovery;

means for resetting said uncorrectable error recovery; and means for determining a status for said uncorrectable error recovery.

7. The memory device of claim 6 wherein said uncorrectable error recovery activation means, said uncorrectable error recovery deactivation means and said resetting means comprise a controller for initializing and controlling said memory device.

8. The memory device of claim 7, wherein said controller includes means for outputting a first signal for activating and deactivating said uncorrectable error recovery and means for outputting a second signal for resetting said uncorrectable error recovery, and wherein said uncorrectable error status determining means comprises a first means for latching said first signal and a second means for latching said second signal.

9. A method for determining status for device-level error correction employed by a memory device, wherein said device-level error correction is capable of correcting a predetermined number of simultaneously occurring errors, said method comprising:

(a) determining whether a given error is uncorrectable by said device-level error correctable;

(b) setting a first flag based on whether said given error is determined in step (a) to be uncorrectable;

(c) latching said set first flag;

(d) disabling said device-level error correction if said given error is determined to be uncorrectable in step (a);

(e) setting a second flag based on whether said device-level error correction is disabled in step (d); and (f) latching said set second flag.

10. A method for determining a status for device-level error correction employed by a memory device, wherein said device-level error correction is capable of correcting a predetermined number of simultaneously occurring errors, said method comprising:

(a) determining whether a given error is uncorrectable by said device-level error correction;

(b) setting a first flag based on whether said given error is determined in step (a) to be uncorrectable;

(c) latching said set first flag;

(d) disabling said device-level error correction if said given error is determined in step (a) to be uncorrectable;

(e) optionally reenabling said device-level error correction if disabled in step (d);

(f) determining whether said reenabling option is active;

(g) setting a third flag based on whether said reenabling option is determined in step (f) to be active; and (h) latching said set third flag.

11. The method of claim 10, wherein said reenabling option includes optional resetting thereof and wherein said method further comprises:

(j) determining whether said optional resetting is active;

(k) setting a fourth flag based on whether said optional resetting is determined to be active in step (j); and (l) latching said set fourth flag.

12. A memory device employing error correction, said memory device comprising:

means for activating said error correction;

means for deactivating said error correction; and means for determining a status for said error correction, wherein said determining means comprises:
means for generating said status, wherein said generating means comprises: a correction latch; means for latching said correction latch; and means for resetting said correction latch;
means for latching said generated status; and
means for reading said latched status.

13. An integrated circuit employing error correction, wherein said employed error correction includes correcting an error involving up to a predetermined amount of information, said integrated circuit comprising:

an error correction activator;

an error correction deactivator;

error correction status tracking circuitry; and logic circuitry for determining whether said integrated circuit is capable of correcting a given error, wherein said logic circuitry comprises:
a first logic element for determining whether said given error involves an amount of information less than or equal to said predetermined amount of information; and
a second logic element for determining whether said given error involves an amount of information beyond said predetermined amount of information.

14. The integrated circuit of claim 13, wherein said first logic element comprises a NOR gate.

15. The integrated circuit of claim 13, wherein said second logic element comprises an OR gate.

16. An integrated circuit employing error correction, wherein said employed error correction is deactivated in response to an uncorrectable error and wherein said employed error correction further includes uncorrectable error recovery, said integrated circuit comprising:

an error correction activator;

an error correction deactivator;

error correction status tracking circuitry;

an uncorrectable error recovery activator;

an uncorrectable error recovery deactivator;

an uncorrectable error recovery resetter; and uncorrectable error recovery status tracking circuitry.

17. The integrated circuit of claim 16 wherein said uncorrectable error recovery activator, said uncorrectable error recovery deactivator and said uncorrectable error recovery resetter comprise an initial program load controller.

18. The integrated circuit of claim 17, wherein said initial program load controller outputs a first signal for activating said uncorrectable error recovery activator and deactivating said uncorrectable error recovery deactivator and a second signal for resetting said uncorrectable error recovery resetter, and wherein said uncorrectable error recovery status tracking circuitry comprises a first latch for latching said first signal and a second latch for latching said second signal.

* * * * *